Aug. 30, 1966 R. N. CAMP 3,270,099
METHOD FOR MAKING MULTI-FOCAL LENGTH CONTACT LENSES
Filed Dec. 7, 1964 4 Sheets-Sheet 1

Richard N. Camp
INVENTOR.
BY *J. Vincent Martin*
*Joe E. Edwards*
*J. W. K. Gay*
ATTORNEYS

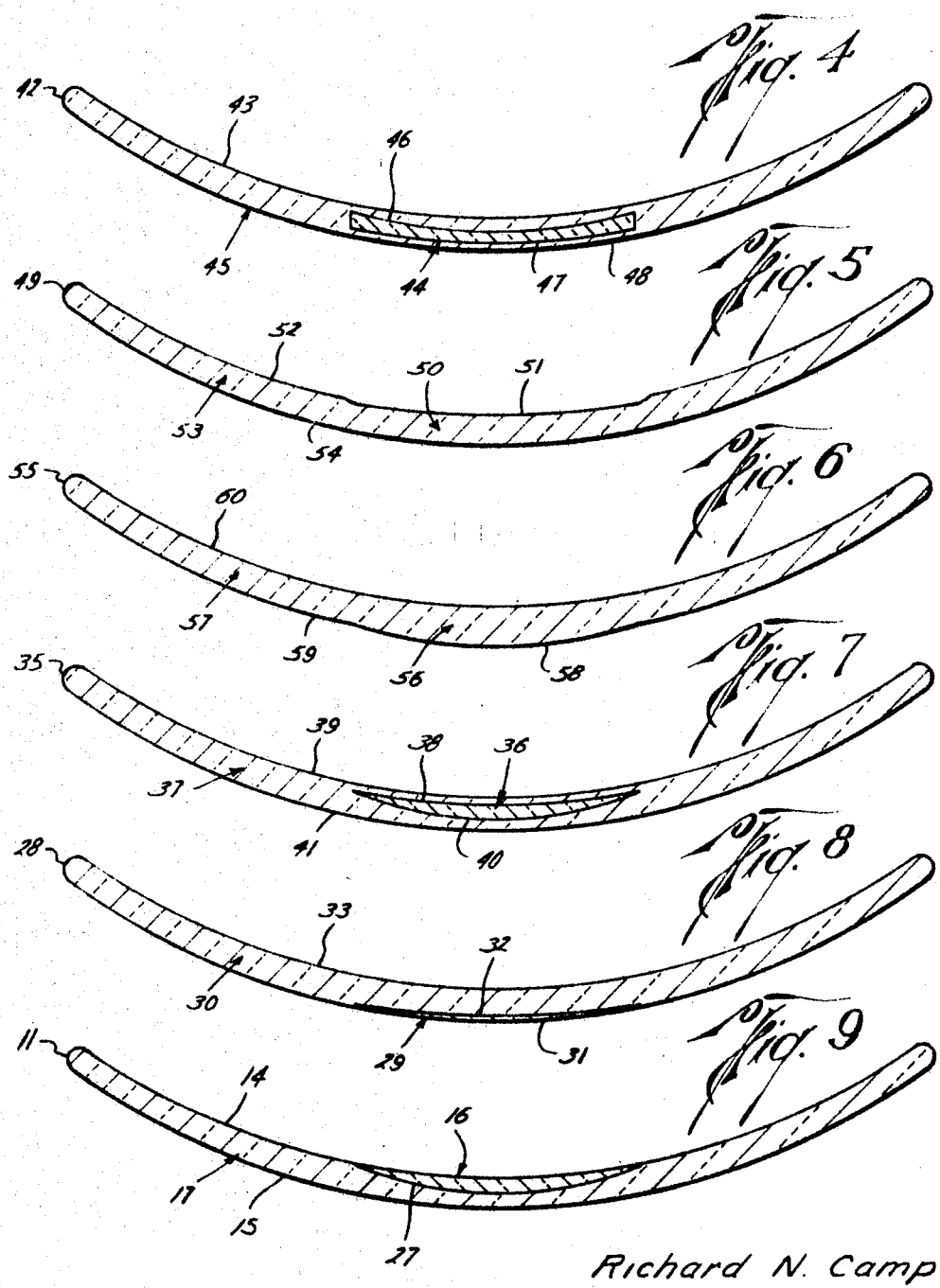

Aug. 30, 1966    R. N. CAMP    3,270,099
METHOD FOR MAKING MULTI-FOCAL LENGTH CONTACT LENSES
Filed Dec. 7, 1964    4 Sheets-Sheet 3
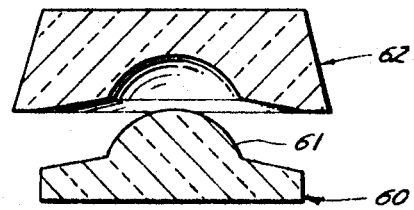
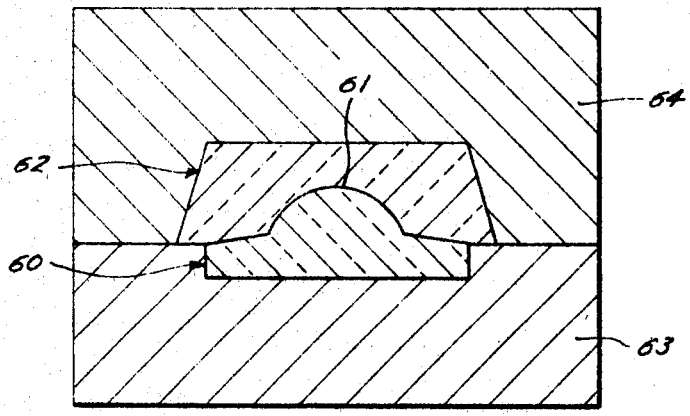
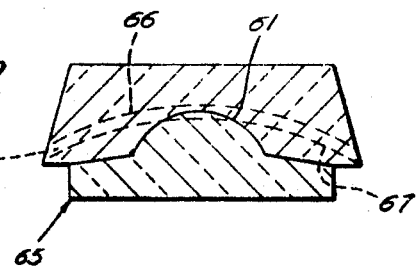
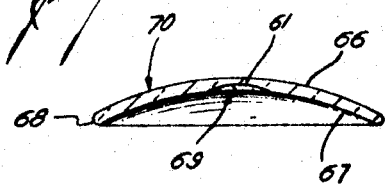
Richard N. Camp
INVENTOR.
BY
ATTORNEYS

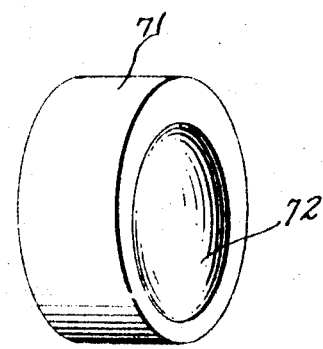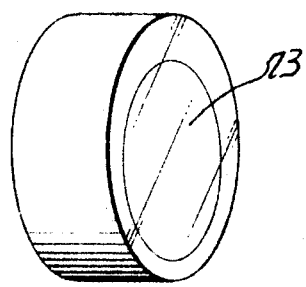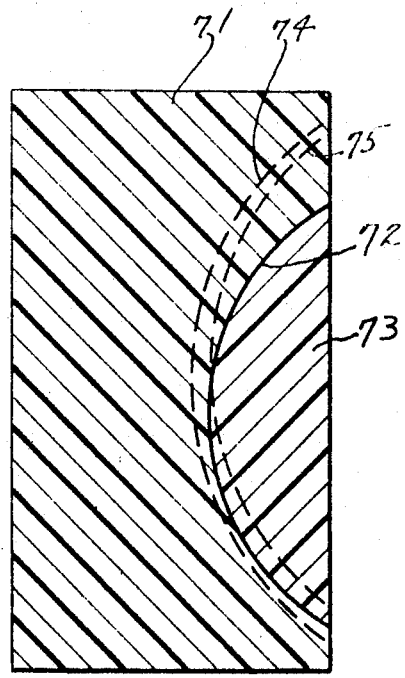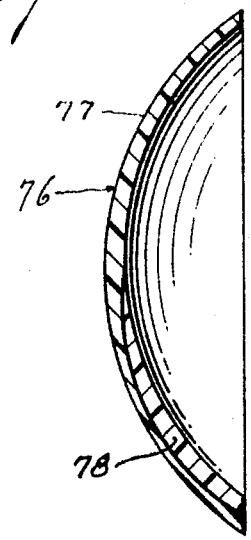

United States Patent Office 3,270,099
Patented August 30, 1966

3,270,099
A METHOD FOR MAKING MULTI-FOCAL
LENGTH CONTACT LENSES
Richard N. Camp, 8119 Glenalta, Houston, Tex.
Filed Dec. 7, 1964, Ser. No. 418,588
2 Claims. (Cl. 264—1)

This is a continuation-in-part of application Serial No. 125,485 filed July 20, 1961 and now abandoned.

This invention relates to contact lenses and more particularly to multi-focal length contact lenses and a method of making same.

Afocal and single focal contact lenses are well known and have been in extensive use for many years. Such lenses provide many desirable advantages over spectacles, but their use has been limited to individuals having visual defects correctable by single optical power lenses. There is and has been a long-standing need for multi-focal length contact lenses, especially bifocal, for use by individuals having visual defects correctable only by multi-power lenses. Notwithstanding this need, a practical multi-focal length contact lens has not heretofore been available. The present invention is directed toward producing multi-focal length contact lenses for correcting visual defects requiring such multi-power structures while retaining all of the advantages of conventional afocal and single focal contact lenses.

It is an object of the present invention to produce a multi-focal length contact lens that is adaptable to provide a corrected near and distant vision while retaining all of the advantages of afocal and single focal contact lenses and a novel method of making such lenses.

A further object is to produce such multi-focal contact lens where the optical system of the lens moves in unison with the eye, and the line of sight is always substantially coincident with the optical axis of the lens.

Another object is to produce a multi-focal length contact lens having a plurality of areas of different optical powers with a common optical axis but in which each area functions independently of the other in conjunction with the optical system of the eye.

Yet a further object is to produce a single or unitary multi-focal contact lens having more than two curved optical surfaces each of which functions as a refracting or optical surface.

Another further object is to produce a multi-focal length contact lens having a central area of a given optical power and a surrounding peripheral area of a different optical power so arranged that no line of demarcation is detectable by the eye.

Yet another object is to provide a novel method of producing the aforesaid multi-focal length contact lenses from conventional lens forming materials including artificial resinous materials.

A further object is to provide a method for producing a multi-focal contact lens having a plurality of areas of different predetermined indices of refraction.

These and other objects will become more apparent when read in conjunction with the following detailed description and the attached drawings wherein:

FIGURE 4 is an enlarged axial section of a lens embodying areas of different indices of refraction to produce more than two optical surfaces;

FIGURES 5 and 6 are enlarged axial sections of lenses in which the central portions of the lenses have optical surfaces with radii of curvature different than the remaining optical surfaces of the lenses;

FIGURES 7, 8 and 9 are views similar to FIGURE 4 showing other forms of lenses;

FIGURE 10 is a vertical cross-section showing in disassembly the general configuration of a block of a refractive material provided with a curved optical surface to serve as a junction curvature and superimposed thereabove a formable mass of a polymerizable refractive material that is to be integrally bonded to the block;

FIGURE 11 is a vertical cross-section showing the block and formable mass of FIGURE 10 pressed together by molds during the bonding process;

FIGURE 12 is a vertical cross-section of the monolithic refractive mass produced from the assemblage shown in FIGURES 10 and 11;

FIGURE 13 is an axial section of a lens similar to that shown in FIGURE 9 produced from the monolithic mass shown in FIGURE 12;

FIGURE 14 is an isometric view of a blank of material having formed therein a curved optical surface;

FIGURE 15 is a figure similar to FIGURE 14 in which the concave portion of the blank shown in FIGURE 14 has been filled with a resin material and has polymerized with the material shown in the blank of FIGURE 14;

FIGURE 16 is a section through the blank of FIGURE 15 showing the relationship of the original blank of material, the material filling the concave in the original blank, and in dotted lines the lens to be cut therefrom; and FIGURE 17 is a sectional view through a lens cut from the blank of FIGURE 16 along the dotted lines shown in FIGURE 16.

Most of the objects of the present invention are achieved by the production of a lens of the present invention which has a central portion of one optical power and a peripheral portion of a different optical power surrounding the central portion. The central and peripheral portions are arranged so that their optical axes coincide and the central portion has a diameter substantially equal to the diameter of the center portion of the cornea of the eye that is not used in a primary sense in distant vision, that is, at distances greater than about 15 feet.

Figure 1:
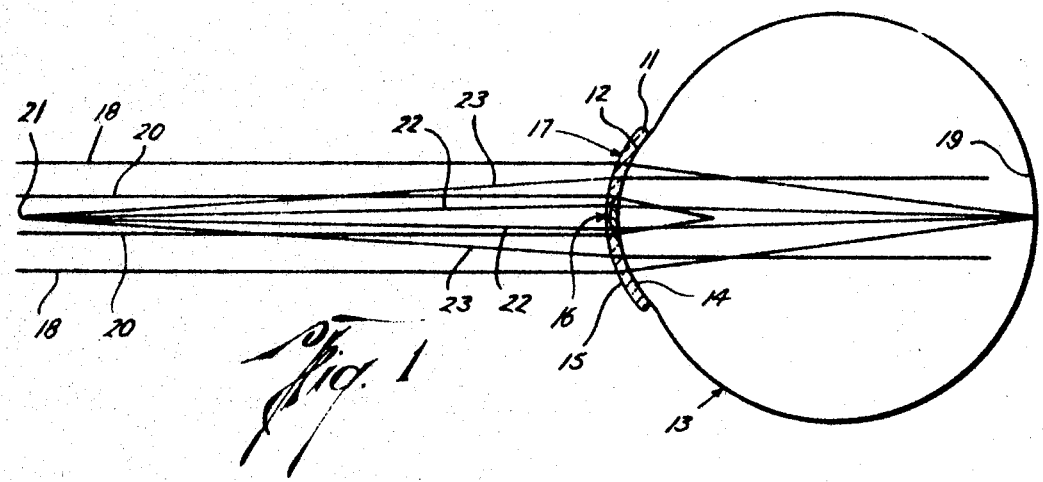
FIGURE 1 is a schematic illustration in axial section of a lens worn on an eye.

Referring to the drawings, a detailed description of a preferred illustrative embodiment of the present invention will now be given. As seen in FIGURE 1, a lens is generally indicated by the numeral 11 and is worn on the cornea 12 of the eye 13. The lens 11 is in the form of a corneal lens of a small thin miniscus of preferably clear and transparent refractive materials. It is to be noted that the present invention is not limited to the production of corneal lens but may be utilized in other forms of contact lenses if so desired.

The lens 11 has a posterior optical surface 14 of approximately the same shape as the cornea 12 and an anterior optical surface 15 of the radius of curvature dependent upon the optical characteristics desired from the lens. The lens 11 is comprised of a unitary structure having a central portion 16 and a surrounding peripheral portion 17 of different optical powers. The term optical power is used in its definition as the reciprocal of focal length and depends not only upon the radii of curvature of the optical surfaces but also upon the relative index of refractions of the refractive materials of such portions. The optical axes of these portions coincide. The central portion 16 has a diameter substantially equal to the diameter of the portion in the center of the cornea 12 of the eye 13 that is primarily used for near vision.

That this area is of secondary importance in near vision can be readily appreciated when the optical system of the eye 13 is considered. Parallel or near parallel light rays 18 from a distant object enter the peripheral portion 17 of lens 11 and in connection with the eye's optical system are brought to focus on the retina 19.

When a near object 21 is viewed, the light rays 22 diverge outwardly therefrom and those which enter the central portion 16 of the lens 11 are focused on the retina 19 in connection with the optical system of the eye. The divergent rays 23 which enter the peripheral portion 17 are not focused on the retina 19 and hence are unseen. Thus, the central portion 16 is used for near vision and the peripheral portion 17 for distant vision.

By placing the optical axis of the central portion 16 in alignment with the line of sight of the eye and making the area of this portion in a plane perpendicular to the optical axis substantially equal to the area in the center of the cornea 12 that cannot be seen in distant vision, the central and peripheral portions 16 and 17 may be provided with the necessary optical powers to correct the visual defects of near and far vision respectively and can function independently of one another in conjunction with the optical system of the eye.

In this manner a multi-focal length lens, specifically a bifocal, can be arranged as a contact lens so that the optical system of the lens is moved in unison with the eye and the line of sight of the eye is always substantially coincident with the optical axis of the lens. Further, the normal functioning the eye's optical system selects the proper lens portion which is required to assist in correctly focusing the image light rays on the retina and therefore all the well known advantages of the conventional afocal and single focal contact lens are preserved in the multi-focal lens.

Figure 2:
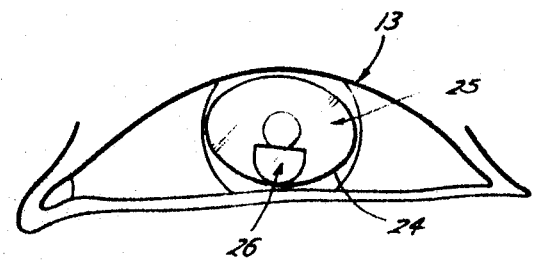
FIGURE 2 is a front elevation of a bifocal contact lens wherein the optical axes of its optical surfaces are divergent and the eye is positioned for distant vision.
Figure 3:
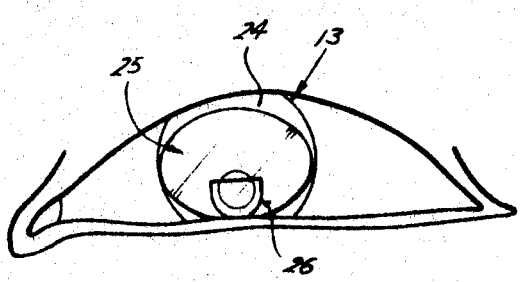
FIGURE 3 is a view similar to FIGURE 2 but with the eye rotated downwardly relative to the lens to a position for near vision.

That this arrangement possesses great utility and provides advantages and results never before obtained with contact lenses can be appreciated when compared to the noncoaxial bifocal lens shown in FIGURES 2 and 3. The lens 24 consists of a distance portion 25 into which is ground a spade-shaped second optical power area 26. The optical axes of portion 25 and area 26 are divergent. Thus, the eye's line of sight has to be aligned through the distance portion 25 for distant vision as in FIGURE 2 and the eye rotated vertically downwardly relative to the lens 24 to align the eye's line of sight through the second optical area 26 for near vision as seen in FIGURE 3. The great difficulty in maintaining proper orientation of the lens 24 on the eye in addition to cloudy vision resulting at the meeting surfaces of the two optical areas renders the coaxial lenses preferable.

Proceeding to a more specific description of the lenses shown in FIGURES 4, 7, 8 and 9, it is noted that each of these lenses may be correctly denoted as a lens within a lens inasmuch as one portion of the lens has an index of refraction and optical power different from the remaining portion of such lens. A unique method will be hereafter described whereby these lenses are readily and conveniently produced.

In FIGURE 9 there is shown in greater detail the lens of FIGURE 1 and lens 11 is of a general concavo-convex form in section. The lens 11 is comprised of several portions of different predetermined indices of refraction integrally bonded together to provide a unitary or monolithic refractive mass in such a manner that no visible line of demarcation is present between the portions to produce clouded vision. The central portion 16 of lens 11 has a higher index of refraction than the peripheral portion 17 with an optical surface 27 therebetween which serves as a junctive curvature. Anterior and posterior optical surfaces 14 and 15 respectively are formed adjacent the optical surface 27 with the optical axis of such surfaces coinciding. Thus, lens 11 has more than two curved optical surfaces. The radii of curvature of the optical surfaces in consideration of the indices of refraction of the portions of lens 11, can be readily determined by calculations well known to those skilled in the optical arts so that the desired optical powers in lens 11 are obtained. Generally the optical surfaces are spherical but they may be somewhat aspherical where certain visual conditions in the eye exist.

The central portion 16 of the lens 11 is used for near vision and therefore usually will be provided with an optical power to correct for near vision, whereas the peripheral portion 17 will be provided with an optical power to correct for far vision. Of course, other areas of different optical powers may be provided with their optical axes coincident in lens 11 for correcting intermediate visual defects between near and distant vision.

The central and peripheral portions 16 and 17 of lens 11 seen in FIGURE 9 have their posterior concave optical surfaces of equal radii of curvature and extending from a common source on the optical axes of lens 11 and the radius of curvature of the optical surface 27 is less than that of the posterior optical surface 14.

The lens 28 of FIGURE 8 is of the type illustrated in FIGURES 1 and 9 except that it has central and peripheral portions 29 and 30 provided with anterior convex surfaces 31 of equal radii of curvature and extend from a common source. The radius of curvature of an optical surface 32 is greater than that of the anterior optical surface 31 formed on lens 28. Otherwise the description applied to the lens of FIGURES 1 and 9 applies equally to lens 28.

The lens 35 of FIGURE 7 is of the type illustrated in FIGURES 1 and 9 except that its central portion 36 is positioned medially within and completely surrounded by a peripheral portion 37. The central and peripheral portions have their posterior optical surfaces 38 and 39 of equal radii of curvature but extending from different sources on the optical axis of the lens. The radius of curvature of an anterior optical surface 40 of the central portion 36 is smaller than that of the posterior optical surface 39 of the peripheral portion 37 formed on lens 35. Otherwise the description applied to the lens of FIGURES 1 and 9 applies equally to lens 35.

When the index of refraction of the peripheral portion is greater than that of the central portion, the lens may take the form shown in FIGURE 4. The lens 42 is of a general concavo-convex form in section with a posterior optical surface 43 adapted to be worn on the cornea of the eye. The lens 42 has a central portion 44 with its optical axis aligned with a peripheral portion 45. The central portion 44 is medially positioned within and completely surrounded by the peripheral portion 45. In order to provide a negative optical power in the central portion 44, the radius of curvature of the posterior concave optical surface 46 of the central portion 44 is smaller than that of the anterior convex optical surface 47 of the central portion 44.

It is obvious from the foregoing that the desired optical characteristics of each lens portion is determined by the indices of refraction of each portion and the radii of curvature of the various optical surfaces formed thereon.

In FIGURES 5 and 6 are shown other forms of the present invention in which a single refractive material is used to form each lens. There are more than two curved refractive surfaces provided on the lenses by variations in the radii of curvature of either, or both, the anterior and posterior surfaces about the central portions of the lens to provide the multi-focal length characteristic desired.

The lens 49 shown in FIGURE 5 has a general concavo-convex form in section. The lens is provided a central portion 50 surrounding the optical axis of the lens and a peripheral portion 53 disposed about such central portion. The central and peripheral portions 50 and 53 respectively are provided with posterior optical surfaces 51 and 52. The surface 51 has a greater radius of curvature than surface 52 or any remaining optical surface of the lens. Lens 49 is provided with an anterior optical surface 54 of uniform curvature. The lens 55 shown in FIGURE 6 has a general concavo-convex form in section and has a central portion 56 surrounded by a peripheral portion 57. The central portion 56 has an anterior optical surface 58 of the lesser radius of curvature than an anterior optical surface 59 formed on the peripheral portion 57. The lens' posterior surface 60 is of uniform curvature. The central portions of the lenses in FIGURES 5 and 6 have a diameter substantially equal to the diameter of the area in the center of the cornea of the eye that is not primarily used in distant vision. The central portions may be provided a negative optical power and the peripheral portions a positive optical power to correct for bifoculary visional defects. The lenses 49 and 55 of FIGURES 5 and 6, respectively, provide the same advantage as the priorly described lenses having areas of different indices of refraction. However, the juncture between curves of different radii of the various optical surfaces are somewhat difficult from the manufacturing standpoint to merge so that some distortion of vision, as cloudy vision, does not occur at the meeting surfaces of the two optical areas. Because of the more difficult manufacturing required for the lenses of FIGURES 5 and 6, the other forms of lenses such as shown in FIGURES 1, 4, 7, 8 and 9 are preferred.

Referring to FIGURES 10, 11, 12 and 13 of the drawings, a detailed description of a novel method of producing lenses such as shown in FIGURES 1 and 9, having areas of different indices of refraction will be given. It is to be understood that this same method may be readily applied to any or all of the lenses shown in FIGURES 1, 4, 7 and 8 if so desired. Also, lenses of the type shown in FIGURES 2 and 3 may be formed by this method.

The use of artificial resinous materials particularly acryloid plastics which have been formed into cured blocks generally in the form of precast rods or cut buttons and from which afocal and single focal contact lenses can be formed by conventional methods are well known. These acrylic materials are generally selected from the group consisting of the polymers and copolymers of methyl methacrylate, ethyl acrylate and mixtures thereof. Methyl methacrylate is preferred because of its greater availability and desirable qualities. The materials from this group have been polymerized by heat and catalysts such as benzoyl peroxide, or other means, into blocks which thereafter are cured according to the plastic manufacturers' recommended procedures into a cured block of a refractive material. The cured blocks of refractive materials are sold under the trade names of Plexiglas, Crystallite, Electroglass and Lucite.

There is shown in FIGURE 10 such a cured block 60 having a predetermined index of refraction. The block 60 has a raised portion of known height and diameter upon which a curved optical surface 11 is formed. The surface 61 will be a juncture curvature to which a formable mass 62 of a polymerizable artificial resinous material will be integrally bonded.

The curved surface 61 may be formed to any desired shape other than the convex surface shown and its shape depends upon the desired optical characteristics of the resultant lens.

The formable mass 62 of the polymerizable material is of a similar nature to the cured block so that it can be integrally bonded thereto with no visible line of demarcation at the juncture curvature. However, the formable mass after polymerization and curing must have a different predetermined index of refraction than block 60. Polymerizable acrylic materials selected from the group consisting of the monomers and polymers of methyl methacrylate, ethyl acrylate and mixtures thereof are usable. Methyl methacrylate is preferred because of its availability and desirable properties. A large number of such materials are commercially available and may be molded into blocks from which conventional lenses can be formed. These materials generally are mixtures of the monomers and polymers, having a physical state of viscous liquids or powdered solids which can be blended together into a dough-like state for convenient handling. The index of refraction of the final refractive material of such formable masses can be varied by adding or omitting ingredients therewith before polymerization or varying the condition of polymerization in a manner well known to those skilled in the art.

Such formable acryloid materials are sold under the trade names of K–33, Plexiglas, Vermonite, Acralite 88 and HydroCast, all of which are found suitable and polymerize into refractive materials under the conditions of heat and catalysts such as benzoyl peroxide, or other similar means.

Two-piece molds 63 and 64 adapted to be moved relatively to one another in aligned relationship are used to provide sufficient pressure to urge the formable mass 62 into intimate contact with block 60. Mold 63 is adapted to receive block 60 as seen in FIGURE 11. When the molds are closed over block 60, they define a cavity about the curved surface 61 of block 60. This cavity has a cross sectional form as illustrated by the formable mass 12 superimposed over block 60 in FIGURES 10 and 11.

The desired quantity of the formable mass 62 to fill the mold cavity is placed over block 60 and the molds are closed with a pressure sufficient to press the mass 62 into intimate contact with the juncture curvature provided by optical surface 61 of block 60. Any excess of the formable mass is squeezed out from between the molds. This pressure is maintained for whatever time is required to polymerize the formable mass 62 into an integral bond with block 60 by intermingling of the acrylic materials adjacent surface 61 to form a monolithic mass 65 as seen in FIGURE 12. Usually at ambient or room temperatures this requires two hours, but high temperatures may shorten this time or lower temperatures may lengthen such time. Thereafter, the temperature of the monolithic mass 65 is raised to a curing temperature at which the mass becomes clear and maintained at such temperature for a sufficient time whereby the entire monolithic mass 65 is clear and no line of demarcation is visible along optical surface 61. The mass is of course cured according to the plastic manufacturer's recommended procedures. It has been found that curing at 212° F. for three hours is sufficient but higher temperatures for shorter curing time or lower temperatures for longer curing times can be used. Thus, the cured monolithic mass 65 has two areas of different predetermined indices of refraction provided by the blocks 60 and the polymerized formable mass 62.

The monolithic mass 65 is removed from molds 63 and 64 and following conventional procedures there are formed in the monolithic mass 65 anterior and posterior optical surfaces 66 and 67 respectively (shown in chain lines in FIGURE 12), adjacent the optical surface 61 to produce the lens 68 shown in FIGURE 13. At least one of the surfaces 66 and 67 intersect the optical surface 61 as shown in FIGURES 12 and 13. These optical surfaces 61, 66 and 67 are so arranged that their optical axes coincide and the lens 68 is comprised at least in part of the cured block 60.

It is evident that the height and diameter of the upstanding part of the block 60 result in the lens 68 having a central portion 69 of a predetermined index of refraction of an area in a curved plane perpendicular to the optical axis of the lens substantially equal to the area in the center of the cornea of the eye that cannot be seen in distant vision, that is, approximately 3.0 mm. in diameter. The formable mass 62 provides the peripheral portion 70 of lens 68 of a different predetermined index of refraction. By this arrangement, the optical power of the central portion 69 may be different than that of the peripheral portion 70 of lens 68 to provide a truly bifocal length contact lens that can function in complete harmony with the eye's optical system. Since no line of demarcation is visible to the eye, no cloudy area in the lens 68 where the various curved optical surfaces meet can exist. The advantages of this method of producing a multi-focal lens over the tedious and expensive grinding methods heretofore known are apparent.

Obviously, by shifting the lens portion 69 to an off-center position, lenses of the type shown in FIGURES 2 and 3 may be fabricated. It is further obvious that more than two concentric focal-length lenses may be constructed in accordance with this invention to provide between the near and distant vision portion of the lenses a concentric correction for intermediate vision.

FIGURES 14 through 17 illustrate the formation of a contact lens without the use of pressure.

It has been found that the resin materials utilized to form the lens of this invention will polymerize together without the application of pressure. As shown in FIGURE 14, a blank 71 of solid resin material of the type hereinabove defined may have formed therein a concave depression 72. This concave depression forms the optical surface which is the juncture between the two resins of different index of refraction.

As the blank 71 has a suitable surface 72 formed therein, it is positioned with the depression facing upwardly and the depression is filled with resin material of the type hereinabove defined and referred to as a formable mass. In order that air bubbles will be excluded and that the formable mass join with the solid mass 71 in polymerization of the formable mass, it is preferred that the formable mass have a viscosity such that it will readily pour and completely fill the depression 72 without the necessity of adding pressure. Preferably, the formable mass has a physical state resembling cane syrup at about 70° F.

The blank 71 having its concavity 72 filled with the formable mass 73 is then cured until the formable mass 73 is polymerized. While polymerization will usually occur without the application of extraneous heat, it is preferred to use heat to hasten the curing process.

As shown in FIGURE 16, the cured mass is then used as a blank from which the lens is cut along the dotted lines 74 and 75. From FIGURE 17 it will be noted that this lens, indicated generally at 76, preferably has a portion 77 which is formed from the material of blank 71 and a portion 78 which is cut from the material 73. As the materials of 77 and 78 have different indexes of refraction a bifocal lens will result.

It has been found that lenses manufactured in the manner just explained result in a satisfactory bond between the blank of material 71 and the formable mass 73 and the uniting of the two materials is sufficient to insure their remaining together under all conditions of use.

Primary optical power lens, as used herein, is meant to be that type of correction in a lens to correct for distance vision. Secondary optical power lens, as used herein, is meant to be that type of correction in a lens to correct for near vision.

From the foregoing it will be seen that a novel method of making lenses has been provided that achieves all the stated objects of the present invention. While illustrative embodiments of the present invention have been fully described, it will be understood that various changes may be made by those skilled in the art without departing from the spirit of the invention.

What is claimed is:
1. The method of producing a multifocal lens comprising the steps of,
   providing a curved optical surface on a cured block of polymerized artificial resinous material having a selected index of refraction,
   molding a polymerizable mass of artificial resinous material which when cured has a selected different index of refraction from said cured block by polymerization onto the curved optical surface of said cured block to form an integral bond between the resinous materials of the formable mass and the cured block at the curved optical surface,
   curing the formable mass of resinous material to form a monolithic mass,
   forming from a portion of said monolithic mass a lens having anterior and posterior optical surfaces of the desired lens optical characteristics having the same general curvature as said cured optical surface with the curved optical surface intersecting at least one of the anterior and posterior surfaces,
   the portion of the lens containing said three surfaces providing a different focal length than the remainder of the lens.

2. The method of producing a multi-focal lens comprising the steps of,
   providing a curved optical surface on a cured block of polymerized methyl methacrylate having a selected index of refraction,
   molding a polymerizable mass comprised of the monomers, polymers and mixtures thereof of methyl methacrylate by polymerization onto the curved optical surface of said cured block to form an integral bond between the materials of the formable mass and the cured block at the curved optical surface, said formable mass of polymerizable material when cured having a selected different index of refraction from said cured block,
   curing the formable mass of material to form a monolithic mass,
   forming from a portion of said monolithic mass a lens having anterior and posterior optical surfaces of the desired lens optical characteristics having the same general curvature as said curved optical surface with the curved optical surface intersecting at least one of the anterior and posterior surfaces,
   the portion of the lens containing said three surfaces providing a different focal length than the remainder of the lens.

References Cited by the Examiner

UNITED STATES PATENTS

| | | | |
|---|---|---|---|
| 3,034,403 | 5/1962 | Neefe | 88—54.5 |
| 3,037,425 | 6/1962 | De Carle | 88—54.5 |

ALEXANDER H. BRODMERKEL, *Primary Examiner.*

ROBERT F. WHITE, *Examiner.*

B. SNYDER, *Assistant Examiner.*